(12) United States Patent
Birle, Jr. et al.

(10) Patent No.: US 7,987,129 B2
(45) Date of Patent: Jul. 26, 2011

(54) CONVERTIBLE FINANCIAL INSTRUMENTS WITH CONTINGENT PAYMENTS

(75) Inventors: James R. Birle, Jr., Summit, NJ (US); David K. Dolan, Annandale, VA (US); Jeffrey N. Edwards, Basking Ridge, NJ (US); Yonathan Epelbaum, New York, NY (US); Frederick J. Fiddle, Ridgewood, NJ (US); Emerson P. Jones, Greenwich, CT (US); Stuart C. Kaperst, New York, NY (US); Todd K. Kaplan, Winnetka, IL (US); Daniel Y. Kerstein, Woodsburgh, NY (US); Dragomir K. Kolev, New York, NY (US); Richard P. Luciano, Morristown, NJ (US); Thomas H. Patrick, Jr., New York, NY (US); Paul A. Pepe, New York, NY (US); Eric Steifman, New York, NY (US); Russell L. Stein, Englewood Cliffs, NJ (US); Brennan J. Warble, Bronxville, NY (US); Richard J. Green, Woodbury, NY (US); Robert A. Rudnick, Queenstown, MD (US); Frank R. Strong, McLean, VA (US)

(73) Assignee: Bank of America Corporation, Charlotte, NC (US)

( * ) Notice: Subject to any disclaimer, the term of this patent is extended or adjusted under 35 U.S.C. 154(b) by 2076 days.

(21) Appl. No.: 10/064,745

(22) Filed: Aug. 12, 2002

(65) Prior Publication Data
US 2003/0130941 A1 Jul. 10, 2003

Related U.S. Application Data

(60) Provisional application No. 60/311,574, filed on Aug. 10, 2001.

(51) Int. Cl.
*G06Q 40/00* (2006.01)

(52) U.S. Cl. ........................................ 705/36 R; 705/35
(58) Field of Classification Search ................ 705/37 R, 705/36 R
See application file for complete search history.

(56) References Cited

U.S. PATENT DOCUMENTS
4,648,038 A * 3/1987 Roberts et al. .............. 705/36 R
(Continued)

FOREIGN PATENT DOCUMENTS
WO      WO 01/80051      10/2001
(Continued)

OTHER PUBLICATIONS

Harvard Law Review, Jun. 1991, vol. 104:1857, "Distress-Contingent Convertible Bonds: a Proposed solution to the Excess Debt Problem."*

(Continued)

*Primary Examiner* — Kirsten S Apple
(74) *Attorney, Agent, or Firm* — Michael A. Springs

(57) ABSTRACT

A convertible financial instrument provides incentives to holders to keep the instruments outstanding so that issuers maintain flexibility and control over the maturity date of the instrument and the manner in which it is settled. The instrument may provide issuers with the ability to deduct an amount for tax purposes that approximates the true economic cost of the financial instrument. The instrument may contain a provision calling for contingent payments (which may include, for example, contingent interest, preferred distributions, contingent principal, dividends, and other pay-outs) to the holder in some circumstances, which may be based on formulae calculations. For example, this may occur when the trading value of the convertible instrument exceeds a pre-determined value such as, for example, a certain percentage of the accreted value of the convertible instrument, or, for example, another circumstance that may trigger a contingent payment may be when the price of another financial instrument (e.g., the underlying security, the reference security, etc.) is below, higher than, or equal to a pre-determined value.

63 Claims, 6 Drawing Sheets

U.S. PATENT DOCUMENTS

| | | | |
|---|---|---|---|
| 4,739,478 A | 4/1988 | Roberts | |
| 5,062,666 A | 11/1991 | Mowrey et al. | |
| 5,440,106 A | 8/1995 | Duck | |
| 5,704,045 A | 12/1997 | King et al. | |
| 5,742,775 A | 4/1998 | King | |
| 5,970,479 A | 10/1999 | Shepherd | |
| 6,012,925 A | 1/2000 | Kelly et al. | |
| 6,105,007 A | 8/2000 | Norris | |
| 6,321,212 B1* | 11/2001 | Lange | 705/36 R |
| 6,347,307 B1 | 2/2002 | Sandhu et al. | |
| 6,418,419 B1* | 7/2002 | Nieboer et al. | 705/37 |
| 7,024,387 B1* | 4/2006 | Nieboer et al. | 705/37 |
| 2001/0056392 A1 | 12/2001 | Daughtery, III | |
| 2002/0032627 A1 | 3/2002 | Perot et al. | |
| 2002/0077961 A1 | 6/2002 | Eckert et al. | |
| 2002/0099640 A1* | 7/2002 | Lange | 705/37 |
| 2002/0147670 A1 | 10/2002 | Lange | |
| 2003/0009406 A1 | 1/2003 | Ross | |
| 2003/0093375 A1 | 5/2003 | Green et al. | |
| 2003/0115128 A1 | 6/2003 | Lange et al. | |
| 2003/0135436 A1 | 7/2003 | Birle, Jr. et al. | |
| 2003/0135446 A1 | 7/2003 | Birle, Jr. et al. | |
| 2003/0163400 A1 | 8/2003 | Ross et al. | |
| 2004/0006520 A1 | 1/2004 | Birle et al. | |
| 2005/0080706 A1 | 4/2005 | Birle | |

FOREIGN PATENT DOCUMENTS

| | | |
|---|---|---|
| WO | WO 01/80051 A2 | 10/2001 |
| WO | WO 02/42885 | 5/2002 |
| WO | WO 02/42885 A2 | 5/2002 |
| WO | WO 02/074047 | 9/2002 |
| WO | WO 02/074047 A2 | 9/2002 |
| WO | WO03/013875 | 2/2003 |
| WO | WO 03/013875 | 2/2003 |
| WO | WO 03/014885 | 2/2003 |
| WO | WO 03/014886 | 2/2003 |
| WO | WO03/014886 A2 | 2/2003 |
| WO | WO 03/023554 | 3/2003 |
| WO | WO 2004/081748 | 9/2004 |
| WO | WO 2004/081748 A2 | 9/2004 |
| WO | WO 2004/104889 | 12/2004 |
| WO | WO2004/104889 A1 | 12/2004 |
| WO | WO 2005/062224 | 7/2005 |
| WO | WO 2005/062224 A1 | 7/2005 |

OTHER PUBLICATIONS

Bryant, Julie: "Open enrollment draws questions over choices"; Atlanta Business Chronicle: Apr. 28, 2000.

Kollewe, Julia: "IRS Approves Bond Product Criticized as Tax Dodge, WSJ Says"; Bloomberg L.P., Bloomberg News: May 7, 2002, Tuesday 4:46 AM Eastern Time.

Fujita, Junko and Sheldrick, Aaron: "Orix Sells $350 Million of Bonds Convertible to Stock"; Bloomberg L.P., Bloomberg News: May 28, 2002, Tuesday 11:14 PM Eastern Time.

Hahn, Avital Louria: "Amid Underwriting Blues, Merrill Sings a Merry Tune in Zero Convert Market: Firm earns $112 million-plus in one day on a pair of jumbo zeros"; Investment Dealers' Digest: IDD pp. 3-4 Nov. 20, 2000 ISSN: 0021-0080.

EIU ViewsWire: "USA finance: Good news for 'coco' buffs"; The Economist Intelligence Unit Ltd.: Jul. 25, 2002.

Silverman, Gary: Wall Street high on volatile alchemy: Stock Options: Companies have created a source of low-cost funding from the volatility of shares but this entails risks, says Gary Silverman; The Financial Times Limited, Financial Times (London): Jun. 15, 2001, Friday London Edition 1.

Farr, Lucy: "Contingent Convertibles"; Practical U.S./International Tax Strategies: Feb. 13, 2002.

"The 2001 Deals of the Year"; Corporate Finance; p. 72: Euromoney Institutional Investor PLC; Institutional Investor: Jan. 2002.

Springsteel, Ian: "The Convert Boomerang"; Securities Data Publishing; Investment Dealers Digest: Mar. 11, 2002.

The Investing Guys: "Contingent Convertibles—CoCos"; www.investopedia.com : Jul. 28, 2002.

The Investing Guys: "To Convert or Not to Convert"; www.investopedia.com : Jul. 28, 2002.

LJH Global Investments HedgeView, Perspectives on Absolute Return Strategies, Sep. 2001, p. 2 col. 3.

"Medtronic Announces Sale of 1.25 percent Contingent Convertible Debentures Due 2021"; Medtronic New Release, www.medtronic.com: Jul. 28, 2002.

Stempel, Jonathan: "Update: Medtronic Sells $1.75 Billion Convertible Bonds"; Reuters: Sep. 6, 2001.

"Description of ABC Securities"; Merrill Lynch, Jul. 29, 1991.

"Article 11 Conversion"; Indenture, Oct. 1, 1989.

Part I Section 1275.—Other definitions and special rules 26 CFR 1.1275-4: Contingent payment debt instruments. (Also §§ 163, 249; 1.249-1.) Rev. Rul. 2002-31.

Offering Memorandum, Tyco, Liquid Yield Option Notes, Nov. 14, 2000.

Offering Memorandum, SPX Corporation, Liquid Yield Option Notes, Jan. 31, 2001.

Offering Memorandum, Danaher Corporation, Liquid Yield Option Notes, Jan. 17, 2001.

WO 03/013875 Published Feb. 20, 2003.
WO 03/014885 Published Feb. 20, 2003.
WO 03/014886 Published Feb. 20, 2003.
WO 03/023554 Published Mar. 20, 2003.

U.S. Bancorp Raises $1.1 Billion Through Offering of U.S. Bancorp Zero-Coupon Convertible Senior Notes, PR NEwswire. New York: Jul. 31, 2001.

Weinstein, J., Convertibles are Breaking Records, Global Finance. New York: Apr. 2001. vol. 15, Iss, 4; p. 50, 2pgs.

Merrill Lynch Prospectus, Jan. 24, 2001.

* cited by examiner

CONVERTIBLE FINANCIAL INSTRUMENTS WITH CONTINGENT PAYMENTS

CROSS REFERENCE TO RELATED APPLICATIONS

This application claims priority from U.S. application No. 60/311,574, filed Aug. 10, 2001, which application is hereby incorporated herein by reference.

BACKGROUND OF INVENTION

This invention relates generally to convertible and exchangeable financial instruments (e.g., debt instruments, preferred instruments, trust preferred instruments, warrants, certain insurance contracts, and suitable derivatives thereof, or any security backed by any of the above) and methods and systems for offering and servicing the same, and relates more particularly to debt instruments which are convertible into equity instruments.

A common financial instrument is a bond. A bond (more generally termed a "debt instrument") is an instrument having language indicative of a principal amount, and having further language indicative of a borrower's obligation to repay the principal at some future time. Some bonds have still more language indicative of the borrower's obligation to make interest payments at specified times. Other bonds, called "zero-coupon" bonds, do not have language obligating the borrower to make interest payments in cash prior to maturity. Bonds, and the borrowing accomplished by means of such bonds, have been known for centuries.

Many financial instruments, including many bonds, are "negotiable," meaning that the holder may freely sell the instruments to others with few if any restrictions. Such negotiability helps to provide a fluid and efficient market in which the instruments may be bought and sold at ever-changing prices indicative of the value given by the market to the instruments. A would-be borrower benefits from negotiability in many ways, for example because a lender is more willing to lend (to purchase the debt instruments) if it knows there is the prospect of selling the debt instruments to others at a later time. Negotiable bonds, and the borrowing accomplished therewith, have been known for over a century. Under the tax law of at least one country, the issuer of a bond may deduct from its income the interest paid (the "coupon") or the stated yield for the bond. Many business entities will have the ability to raise money by means of a mix of debt instruments (e.g. bonds) and equity instruments (e.g. stock). The mix selected by a particular business entity (often termed its "capital structure") will be influenced in a general way by prevailing interest rates, as well as by other factors such as the extent to which the market at a particular moment is willing to purchase newly issued instruments of one type or the other. Further, a particular business entity will have particular business circumstances which influence this mix, such as the amount of debt already outstanding, the entity's bond credit rating, and the price-to-earnings (P/E) ratio for the entity's stock. Because the entity's financial condition (particularly for publicly held entities) is reported according to generally accepted accounting principles, the effect on the reported financial condition of a particular change to this mix is often an important factor influencing this mix. Finally, the tax treatment of a particular change to this mix is also often an important factor influencing such decisions.

One example of a convertible security, such as those which are termed "convertible bonds," are instruments which have some of the qualities of bonds as well as some of the qualities of stock. A convertible bond is a bond which can be converted by its holder into a number of shares of equity, the number being a fixed number or being determined by a formula. It is thus possible to define a "conversion ratio" which is the number of shares of common stock that could be obtained by converting each share of the convertible instrument. In many instruments the conversion ratio is a constant over the term of the instrument, though in some instruments there may be a provision that the conversion ratio will change over the term of the instrument. Alternatively, the instrument may state a "conversion price" per share. With such an instrument the conversion price is divided into the par value of the bond to determine the number of shares available in the conversion. The instrument may contain a provision that this ratio may change over time.

At issuance, the value of the bond is typically greater than the value of the fixed number of shares into which the bond is convertible. For example, a bond may be issued for $1,000 with a right to convert into ten shares of the issuer's common stock, at a time when the current market value per share is $83. Ordinarily, under these terms, the stock would have to appreciate to at least $100 per share before it would be economically rational for the holder to exercise its right to convert the bond. A convertible bond of this kind is described as having a roughly 20-percent conversion premium, because the stock must appreciate about 20 percent (i.e. $17) before the conversion right has intrinsic value. This conversion premium may be thought of as the dollar or percentage amount by which the price of the convertible instrument exceeds the current market value of the common stock into which it could be converted. It is thus possible to define a "conversion value" which is the value of a convertible security if it is converted immediately.

Some convertible bonds also provide that the issuer may call the instrument (repay it before the end of the term of the bond) after a number of years, subject to the holder's conversion rights. If at the time of the call the value of the stock has risen above the value of the debt, the holder generally will choose to exercise its conversion right so that it receives the stock rather than the call redemption amount. A holder may also have the right to require an issuer to redeem the bond under specified circumstances.

It is instructive, then, to compare a bond that is convertible, and a bond that is not, from the point of view of the would-be purchaser (the investor) and from the point of view of the issuer. Because the conversion right provides an investor with a possible upside (related to the possible appreciation of the stock price) that the fixed-rate debt of the issuer would not provide, the interest rate on convertible instruments may be lower than the interest rate on fixed-rate instruments. Stated differently, the conversion right may be thought of as an option to acquire issuer stock, and the lower rate of interest compensates the issuer for providing this option. It is thus possible to define a "premium over bond value" which is the positive difference between the market price of a convertible bond and the price at which that bond would sell without the convertibility feature.

Stated another way, in the example of the convertible bond, because the conversion right provides an investor with a possible upside that a fixed rate debt instrument of the issuer would not provide, the interest rate on a convertible bond is lower than the interest rate on a fixed rate debt instrument. Economically, the conversion right is an option to acquire issuer stock, and the lower rate of interest compensates the issuer for providing this option. Convertible bonds have historically provided issuers of such convertible instruments with the ability to deduct for tax purposes only this lower stated amount of interest, which is often considerably below the true economic cost of the financial instrument.

Under the law of at least one country, the holder of a debt instrument with contingency provisions may be required to recognize interest income not at the actual coupon or the actual stated yield, but instead at the rate at which the issuer could have issued a debt instrument that did not have such a contingency and with a maturity and other terms otherwise comparable to the contingent debt instrument. This would generally permit the issuer of the instrument to deduct from its income (for tax purposes) the same amounts as the income accrued to the holder. Under such tax law, however, there is an exception for convertible debt instruments where the only contingency is conversion, and under this exception the issuer is only able to take deductions at the lower stated yield on the bond. This is undesirable from the tax point of view for the issuer.

It is instructive, then, to compare a convertible bond that has contingent payments, and a convertible bond without contingent payments, from the point of view of the would-be purchaser (the investor) and from the point of view of the issuer.

Issuers prefer to have flexibility and control over their capital structure, including, for example, the time and manner in which a convertible financial instrument is settled. That flexibility and control is diminished when a holder exercises its conversion or redemption right before maturity and at a time that is unrelated to an issuer's call of the financial instrument. From the issuer's point of view it would be desirable, therefore, to provide convertible financial instruments, and methods and systems for offering and servicing the same, which provide incentives to holders to refrain from voluntarily converting or redeeming such instruments, so that issuers maintain greater flexibility and control over the maturity date of the instrument and the manner in which it is settled.

Issuers also prefer to deduct an amount for tax purposes that more closely approximates the true economic cost of the financial instrument. As mentioned above, the tax law can limit an issuer's ability to deduct the true economic cost of a financial instrument under certain circumstances. It would be desirable, therefore, to provide convertible financial instruments, and methods and systems for offering and servicing the same, that provide issuers with the ability to deduct an amount for tax purposes that more closely approximates the true economic cost of the financial instrument.

A further problem can arise for would-be purchasers of debt instruments. A would-be purchaser (or an underwriter in a position to underwrite issuance of such instruments) may find that potential issuers of such instruments are not easy to find. It is then extremely desirable if the underwriter is able to devise some significant and nontrivial variant on the prior-art debt instruments, which variant is somehow of interest to potential issuers when prior-art debt instruments would not be of interest.

One known bond was a particular zero-coupon convertible bond, convertible to stock. With this particular bond, a payment was made to the holder under certain circumstances. For example, if the stock price happened to be above a scheduled level, the bond would pass through an amount equal to the dividends paid to the underlying shares. Stated differently, the issuer would pay to the holder an amount equal to the dividends paid with respect to shares of the type into which the bond could be converted. An objective of this payment provision was to deter conversion, that is, to motivate a holder to refrain from converting.

Another known bond of this general type also provided for payment to the holder in the event of an extraordinary dividend, meaning a case where the dividend was larger than the stock price the day before the dividend was paid. This particular bond, however, only permitted the issuer to deduct a lower stated amount of interest, which might be considerably below the true economic cost of the instrument.

This particular bond also provided that the ratio (the number of shares into which the bond could be converted) would be recalculated in the event the dividend was greater than 12½ percent of the stock price in a six-month period, or greater than 25 percent of the stock price in a twelve-month period. The new ratio was the old ratio times the stock price prior to the dividend, divided by the stock price prior to the dividend plus the dividend.

Much effort has thus been expended in recent years to attempt to devise new and different debt instruments, and particularly, new and different convertible debt instruments, which offer advantages over those in the prior art. These efforts necessarily entail devising methods and systems for offering and servicing such financial instruments. It is noted in passing that U.S. Pat. No. 5,062,666 to Mowry et al. has claims directed to a financial instrument per se. That particular financial instrument is not, apparently, directed toward the problems described herein.

Experience shows, however, that the majority of such efforts are unavailing. In some markets, for example, it may be extremely difficult to devise an instrument which somehow works sufficiently to the advantage of both issuer and purchaser to make possible the issuance of the instrument.

If it were possible to devise a convertible debt instrument, or a family of convertible debt instruments, which through their provisions somehow bring about successful market transactions that would otherwise not be possible, this would work to the advantage of issuers and investors. It would, furthermore, make a meaningful contribution toward a more vigorous, more active, and more efficient capital market, thus benefitting the general public as well as particular market participants.

SUMMARY OF INVENTION

A convertible financial instrument provides incentives to holders to keep the instruments outstanding so that issuers maintain flexibility and control over the maturity date of the instrument and the manner in which it is settled. The instrument may provide issuers with the ability to deduct an amount for tax purposes that approximates the true economic cost of the financial instrument. The instrument may contain a provision calling for contingent payments (which may include, for example, contingent interest, preferred distributions, contingent principal, dividends, and other pay-outs) to the holder in some circumstances, which may be based on formulae calculations. For example, this may occur when the trading value of the convertible instrument exceeds a pre-determined value such as, for example, a certain percentage of the accreted value of the convertible instrument, or, for example, another circumstance that may trigger a contingent payment may be when the price of another financial instrument (e.g., the underlying security, the reference security, etc.) is below, higher than, or equal to a pre-determined value.

BRIEF DESCRIPTION OF DRAWINGS

The invention will be described in connection with the accompanying drawing in several figures, in which like reference characters refer to like parts throughout, and in which.

DETAILED DESCRIPTION

Figure 1:
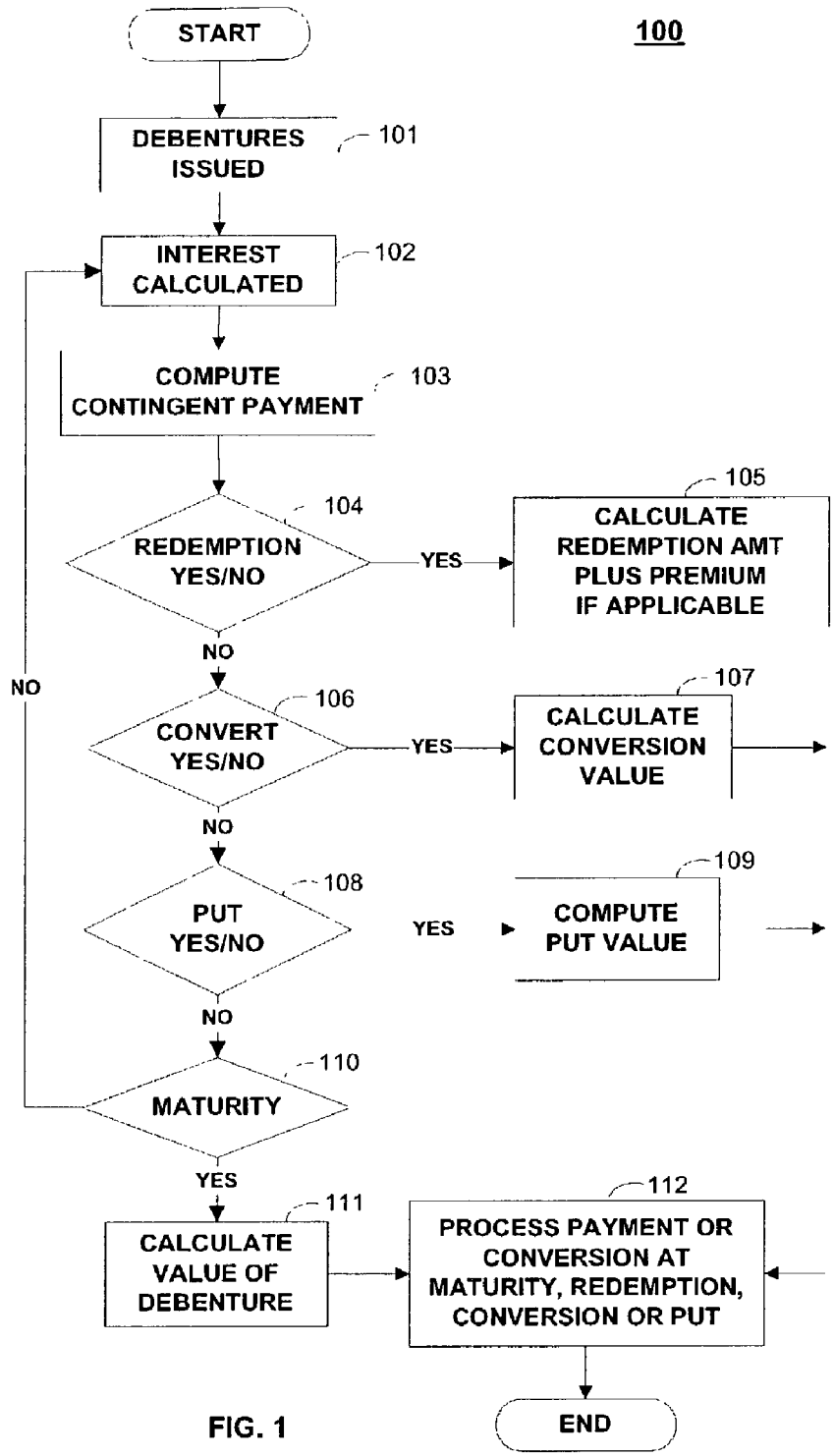
FIGS. 1-3 are generalized flowcharts of illustrative steps involved in providing a company with capital in accordance with some embodiments of the present invention.

The present invention relates to a convertible or exchangeable contingent payment financial instrument, for example, short or long-term zero coupon notes (including, for example, Liquid Yield Option Notes ("LYONs"), cash-pay or partial-cash-pay convertible bonds, debt instruments, preferred instruments, trust preferred instruments, warrants, certain insurance contracts, and suitable derivatives thereof, or any securities backed by any of the above), and systems and methods for offering and servicing the same.

Importantly, with such an instrument according to the invention, the issuer of a financial instrument may make contingent payments to the holder, under certain circumstances or according to predetermined formulae, such as:

if the trading value of the financial instrument or index amount is equal to, greater than, or less than, a predetermined value such as, for example, a percentage of the accreted value.

The relationship between the trading value and the accreted value may be that the trading value exceeds the accreted value by, for example, 110% or 120%.

In this connection, the term "contingent payment" may be inclusive of any additional value to a holder whether paid at the present time or over time, (e.g., contingent interest, contingent principal, accretion of interest, etc.).

The contingent payment may tend to provide some holders with incentives that may tend to make such holder more likely to keep the instrument outstanding. Moreover, some embodiments may provide some issuers with an increased amount of flexibility and control over the period of time the instrument remains outstanding, while potentially minimizing the normal interest due or paid to the holder. This is, as mentioned above in the "background" section, advantageous for an issuer, because the issuer naturally desires to have as much control as possible over its capital structure.

The contingent payments may be based upon, or be equal to, (1) the dividends a holder of the underlying security would normally receive, (2) an index amount, (3) a reference security, or a pool of securities or indices or both.

Increases or decreases in dividends (as compared to the announced dividend policy of the underlying security at the time of issue) may be reflected in the contingent payments to holders. In some embodiments, the timing and amount of contingent payment may be dependent on the trading price of the financial instrument or any underlying security or index. The issuer of a contingent payment financial instrument may be, for example, a publicly-traded, widely-held company.

The contingent payment financial instrument may be, for example, an instrument convertible into a number of shares of the issuer's stock (e.g., common or preferred) (the "conversion shares"), with an initial conversion premium of, for example, approximately 20 percent. The instrument may be callable by the issuer at its "accreted value" (the issue price plus an accrued "discount"), after a predetermined period of time and subject to a holder's conversion right.

The contingent payment financial instrument may, for example, be a convertible debt instrument. If the instrument is callable at any time after the first five years, the issuer may have the right to redeem the instruments at their accreted value. Holders may also have the right to require the issuer to redeem the instruments at their accreted value on each fifth anniversary of the issue date, and upon a change in control of the issuer. The difference between the issue price and principal amount of the contingent payment debt instrument will accrue by a specified percentage. A three-percent yield, for example, may be a reasonable rate under some market conditions. Beginning at a pre-determined period of time (e.g., five years) after issuance of the contingent payment instruments, or at the end of a non-call period, and for each period (e.g., semi-annual, annual, etc.) thereafter, or under circumstances or formulae calculations, the issuer may pay contingent interest if the trading value of the instrument exceeds a specified percentage of the accreted value of each instrument for some pre-determined number of consecutive days (or any other suitable period) immediately preceding the first day of the interest accrual period. In some embodiments, the specified percentage of the accreted value may change, for example, by a predetermined percentage on a periodic basis. Also, in some embodiments, the amount of the contingent payment may change with multiple triggers that may be triggered at specified pre-determined times. Other embodiments may have multiple triggers that may be triggered at any time. In some embodiments, contingent payments may be triggered by only one trigger or by more than one trigger. In some embodiments, a trigger may be any event and may or may not be associated with the financial instrument paying such contingent payments.

From the point of view of the holder, after the non-call period the holder may value the debt instrument, as an economic matter, as a right to convert the debt instrument into issuer stock coupled with a right to receive cash which, if the issuer's stock drops in value, is equal to the accreted value of the instrument. That is, the pure bond features of a contingent payment debt instrument may be valued at that point as a form of "insurance" or put option. Because it may be more valuable, for holders, to have a right to convert the contingent payment debt instrument into the issuer's stock coupled with this bond element than to simply hold the issuer's stock, the trading value of the instrument may exceed the value of the issuer stock into which it is convertible. If the issuer's stock rises enough that the "insurance" or put characteristics of the pure bond elements of the contingent payment debt instrument are reduced in value, however, the trading value of the contingent interest debt instrument may tend to approximate the fair market value of issuer stock.

The trigger level (i.e., the point at which the underlying security may be as valuable as or more valuable than the instrument), may be set at a predetermined percentage, for example greater than 100%, of the contingent payment debt instrument's trading value. Another example of a trigger, in some embodiments, is prevailing market rate for another financial instrument, whether or not issued by the same issuer, by market price, by yield, by formula, or at the discretion of a calculation agent. Some embodiments may have a trigger level set below, at, or above a formula or reference amount, such as a pre-determined percentage of accreted value.

The amount of a contingent payment with respect to a contingent payment financial instrument, for example, may be an amount equal to the cash dividends payable from time to time on the conversion shares, for example, of a convertible bond during the applicable interest period, if any. For example, the amount of contingent interest payable may be no less, however, than 25 basis points multiplied by the trading value of the contingent payment financial instruments (the "Base Amount") or any other base amount formula.

In some embodiments, investors may receive any contingent payments without reduction to the accreted value (including liquidation preference, par, or other amounts) of the contingent payment financial instrument, or other offset. In some embodiments, the accreted value may be reduced by some percentage of the contingent payment paid in order to avoid overcompensation of holders, but the contingent interest paid to investors should not be less than the base amount. Alternatively, a contingent holder may not receive contingent payments currently but instead may receive contingent payment on a later date.

A projected payment schedule may be calculated which projects the timing and amount of contingent payments for various purposes, including but not limited to, tax purposes. Based upon the terms of the issuance of the financial instrument such as, for example, in the case of a contingent payment convertible debt instrument, the issue price, maturity date, conversion premium, stated yield, and comparable yield, the projected payment schedule determines the stock price growth rate or dividend yield (or other formulae determining the contingent payment) and the timing of such payments that is necessary to produce the comparable yield.

Amounts may be calculated to determine whether the expected contingent payments are incidental ("incidental analysis"). For example, in the case of a contingent payment convertible debt instrument, an incidental analysis determines the amount of contingent payments that may be made given different stock price growth rates (or other measure that would influence the amount of contingent payments to made) in comparison to the issue price of the debt instrument (or other base amount). The comparison may be calculated using varying assumptions as to the discount rate, if any.

A probability analysis may be conducted which determines the likelihood that a contingent payment or payments will be made ("remoteness test"). For example, in the case of a contingent payment convertible debt instrument, the remoteness test measures the likelihood that one or more contingent payments will be made over the life of the debt instrument given different stock price growth rates (or other measure that would influence the amount of contingent payments to be made) and stock price volatilities (or other measure that would influence the amount of contingent payments to be made).

FIG. 1 shows a generalized flowchart of illustrative steps involved in providing a company with capital by issuing, in this example, contingent payment debt instruments. The method starts at step 101 where a company, or other entity, issues the instrument. While it is possible to issue certificates to holders of the instruments, it is preferable not to issue such certificates, and instead the holder's ownership of the instruments is recorded by means of bookeeping entries in the records of an appropriate entity such as a transfer agent. At step 101, the original principal amount of the instrument may equal an amount based on predetermined terms.

The method then proceeds to step 102, where interest payments are calculated. step 103, contingent payments may be calculated if a pre-determined contingency is met.

Next, at step 104, if the issuer decides to redeem the instrument, the method proceeds to step 105 to calculate the redemption price. In some embodiments, when a company decides to redeem its instrument, it may redeem some or all of the instruments issued under the same offering. Moreover, with some instruments, if the instruments are redeemed before a preselected date, the system may add a premium to the redemption amount.

The holder, under step 106, may convert an instrument for the underlying security at some time before maturity. The method may either allow a conversion at any time after issue, or may require that conversions (if any) occur only at predetermined times after issue.

At step 108, the method determines whether the holder decided to "put" the security. If yes, the method, at step 109, computes the put value. As is well known in the art, a "put" is an option that gives the holder the right to sell a certain quantity of an underlying security to the writer of the option, at a specified price (called a "strike price") up to a specified date (called the "expiration date").

If, however, the method determines the holder does not want to put the security at step 108, the method proceeds to step 110. At step 110, the bond has reached maturity and the method then calculates the value of the instrument under step 111. Finally, at step 112, the method may process a conversion or a payment to the holder for the value of the matured instruments and any additional payments due.

Figure 2:
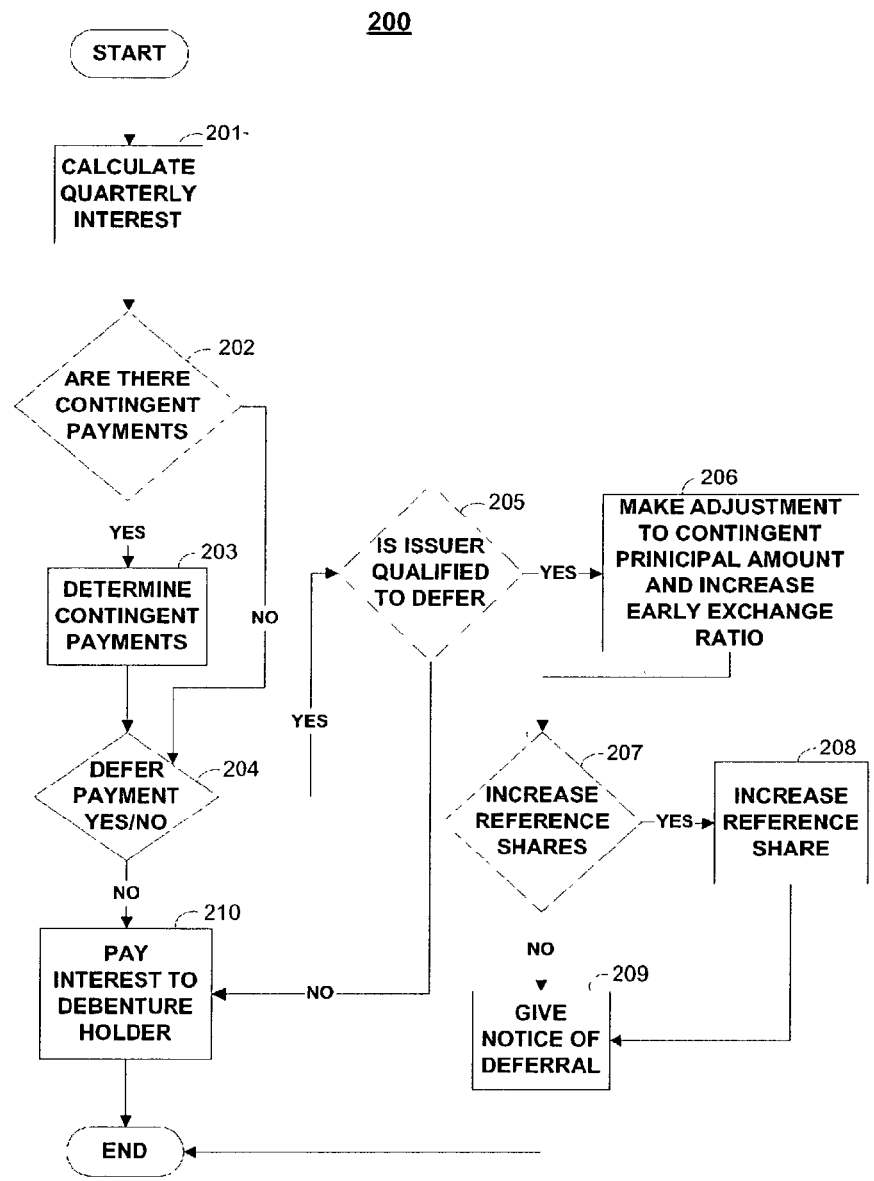

FIG. 2 is a flowchart of illustrative steps involved in calculating interest at step 102 of FIG. 1. At step 201, the rate of interest the issuer must pay to the holder is calculated using a predetermined interest rate. The pre-determined interest rate may be applied to the original principal amount. Moreover, rather than applying a fixed rate throughout the term of the instrument, other variable or adjustable rates of interest may be used depending on what is established in the offering document.

After determining the issuer's interest liability in step 201, the method, at steps 202-203, determines whether contingent payments are called for. A contingent payment may be owed to the holder if, for example, the contingency was based on the underlying security's dividend pay-out. The payment may be owed because the underlying security paid a dividend or other pay-out to owners of the underlying security.

Next, at step 204, the issuing company decides whether it wants to defer payments of interest. This may be decided based on predetermined terms as set forth in offering documents. If interest payments are not deferred, this method proceeds to step 210 and may pay some interest payments from at least one of steps 201 and 202-203 to holders. If, however, payments are to be deferred, at step 205, it must be determined whether the issuer is qualified to defer interest payments. This determination is made using criteria initially disclosed to the holder, for example in the offering document. If payments are not deferred, then the method proceeds to step 210, and pays the interest to the instrument holder. On the other hand, if the issuer is qualified to defer, at 206 the method may make appropriate adjustments to the principal amount and/or the early exchange ratio. The method may also (at 207) determine whether the deferral calls for an increase in the number of reference shares, in which case at 208 the number of reference shares is increased.

The system handling some embodiments of this invention may not use steps 206-208, but may provide notice of deferral at step 209.

Figure 3:
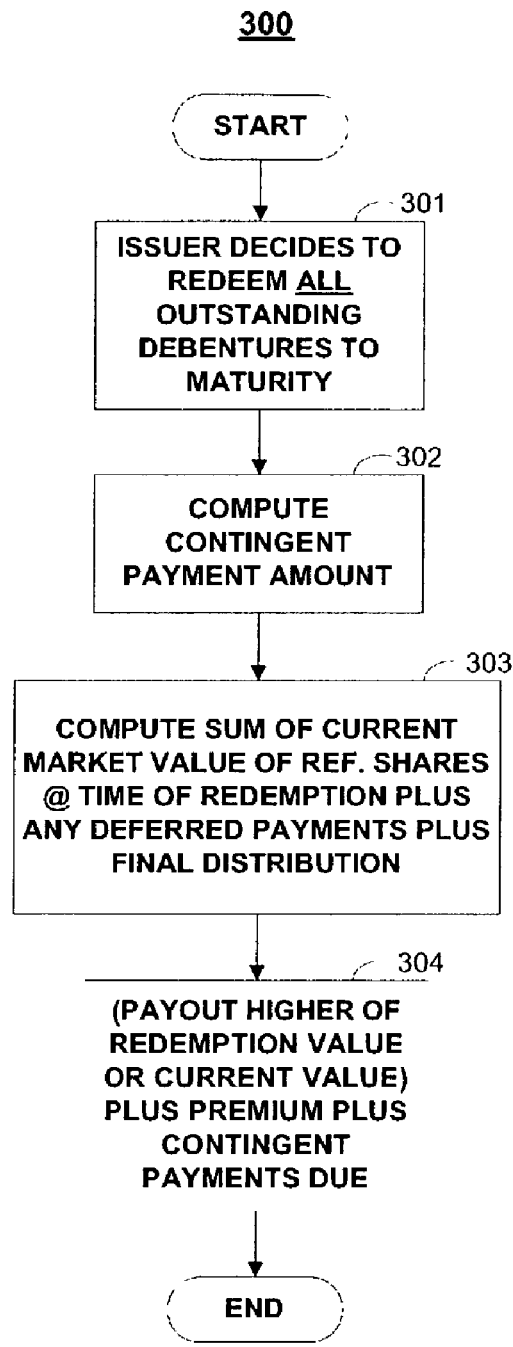

FIG. 3 is a flowchart of illustrative steps involved in redeeming the convertible financial instrument, as shown at step 104 of FIG. 1. The method 300 may be used when, for example, the issuer decides to redeem instruments issued under a particular offering document. At step 301, the issuer decides that it no longer wishes to keep the instruments outstanding and that it wants to redeem the instruments. Next, at step 302, the method determines if contingent payments are due and if so, the amount due. At step 303, the method calculates the current market value of underlying shares at the time of redemption plus any deferred payments. At step 304, the method pays out the appropriate redemption amount plus contingent payment amount, as calculated at steps 302 and 303.

Figure 4:
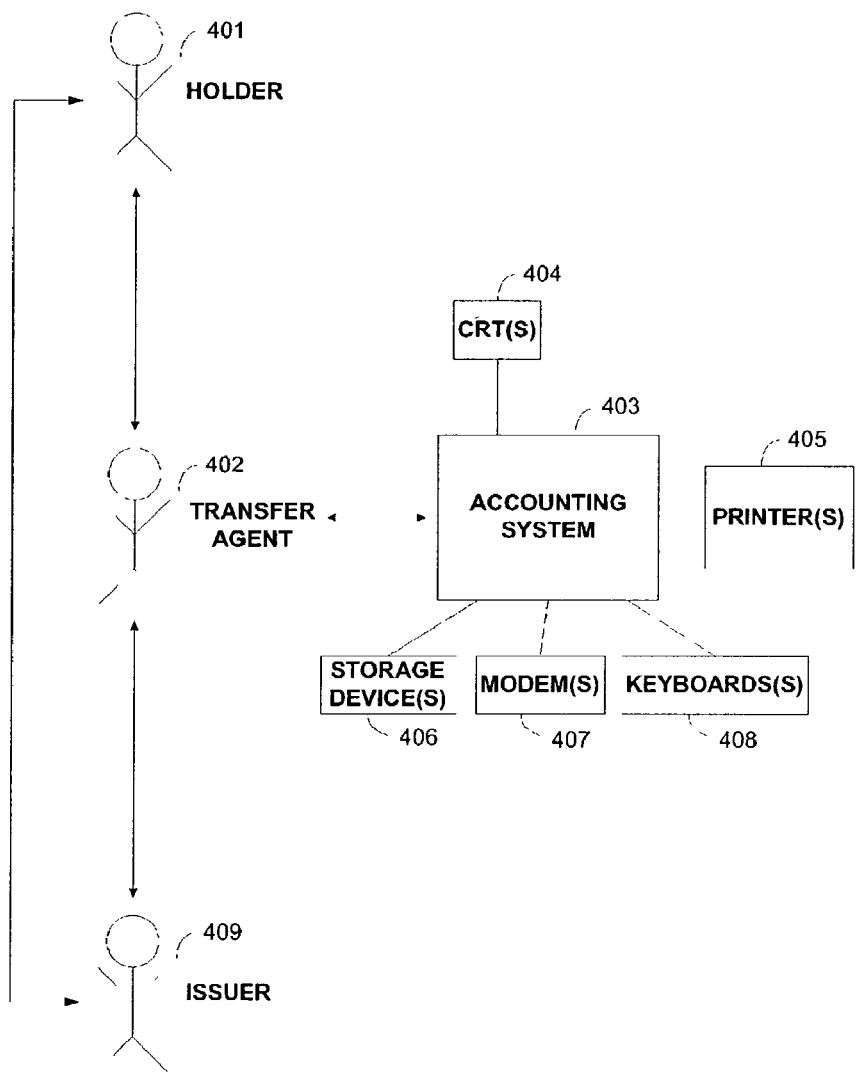
FIG. 4 illustrates the information flow that occurs in issuing and servicing financial instruments, in accordance with some embodiments of the present invention.

FIG. 4 illustrates the flow of information in a system 400 for issuing and servicing instruments. A potential holder 401 requests an offering document that describes the terms of the security. Upon receiving the offering document and purchasing an instrument, for example, from the issuer 409 or through a third party, the transfer agent 402 preferably will track the underlying reference security and service the security, for example, using the methods described in FIGS. 1-3. In doing so, the transfer agent may, for example, use a computerized accounting system 403 capable of tracking the underlying reference security via data lines (network (not shown) or modem 407), tracking any dividend and pay-out from the underlying security, making calculations as set forth in the offering document of the instrument, and using a printer 405 to print periodic (e.g., annual) reports and statements reporting the instrument's value, and gains to the holder for tax reporting purposes.

In addition, the accounting system 403 may maintain pricing data (i.e., issue date, reference underlying instrument's price at time of issue, deferred dividends, etc.) in its mass storage system 406. In addition to the data received through the network or modem 407, the data may be inputted into the accounting system using keyboards 408. The system's modem 407 and network lines may be used to transfer funds to a holder or to a third party intermediary and the printer 405 may also print checks that are delivered directly to the third party or to a third party intermediary. Finally, the transfer agent may view the data from the accounting system using a CRT 404 or reports prepared by the accounting system 403 and printed using the system's printer 405.

Figure 5:
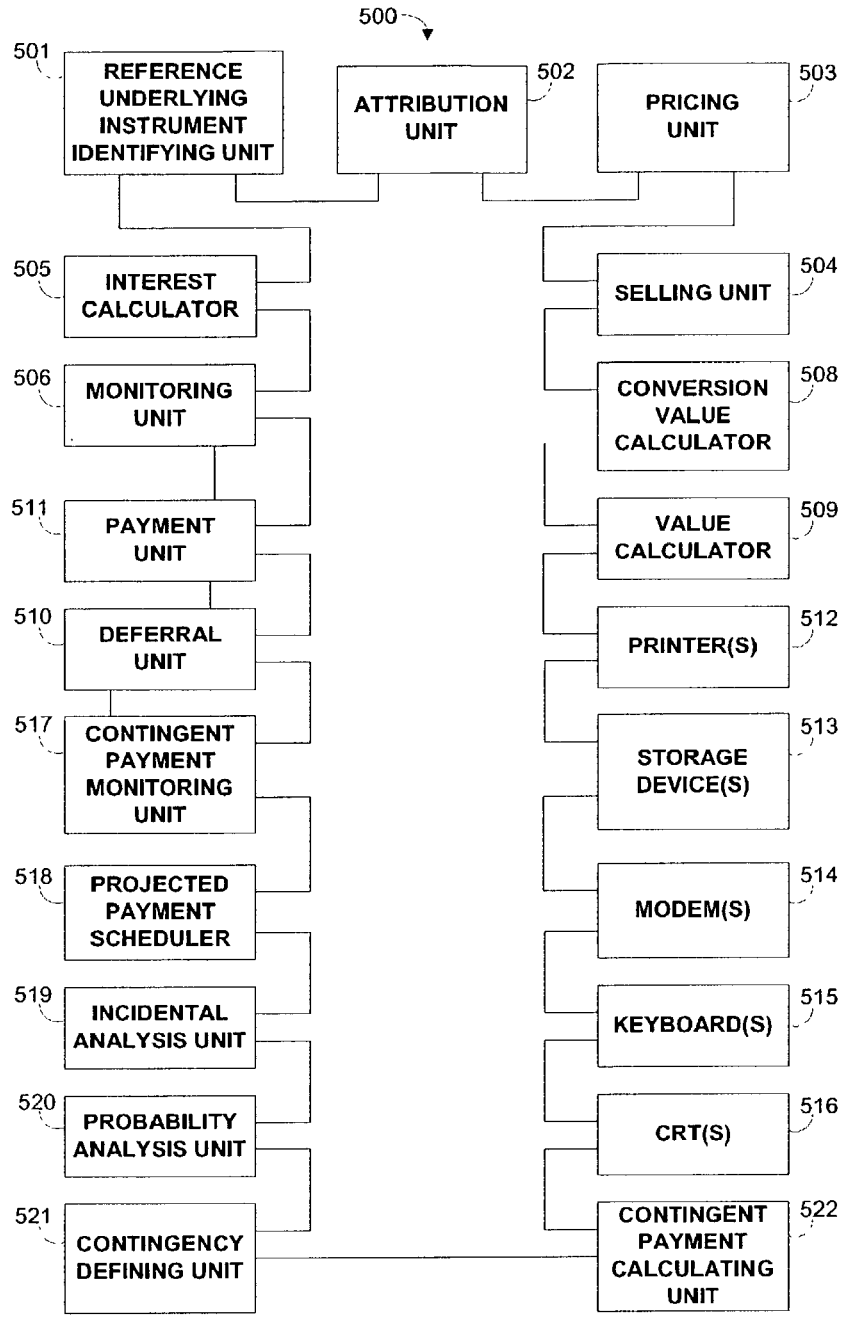
FIG. 5 is illustrative of an exemplary system for implementing the method in accordance with some embodiments of the present invention.

FIG. 5 offers some embodiments of a system 500 for implementing some methods according to the invention. A reference underlying instrument identifying unit 501 is provided to identify (e.g., by user keyboard entry) a reference underlying instrument. An attribution unit 502 is used to attribute a number of the reference underlying instrument's shares to the issuing instrument. Based on the price of the reference underlying instrument and the attributed number of reference instruments, a pricing unit 503 will establish a price for the issuing instrument.

A selling unit 504 processes sales of the instrument to interested investors at the price determined by pricing unit 503. An interest calculator 505, throughout the term of the instrument, calculates interest due to holders on a periodic basis. Furthermore, a monitoring unit 506 tracks any dividend or pay-out of the underlying security.

If during the term of the instrument, a holder decides to convert the instrument into the underlying security, a conversion value calculator 508 calculates the conversion value of the instrument. The value calculator 509 calculates the value of the instrument at the time of redemption (if the instrument is redeemed early by the issuer), and may also be used at maturity (if the instrument remains outstanding until maturity).

A deferral unit 510 processes the results of interest calculator 505 to determine if the calculated amount will be paid or deferred. If the payment amount is not deferred, payment is made by payment unit 511. Furthermore, payment unit 511 processes and makes payment based on the results of conversion value calculator 508, contingent payment monitoring unit 517, and value calculator 509. Payment may be made by check printed by a printer 512 as commanded by payment unit 511. Alternatively payment may be made via electronic transfer by modem 514. Reports listing payments of interest, and other financial data relevant to the holder for tax reporting purposes or other reportable data are printed using printer 512. Any such reports meant for holders preferably are printed and sent to holders periodically, and at least annually. Other reports may be required by regulatory agencies and are printed when required by the relevant regulations. Storage 513, modems 514, keyboards 515, and CRT 516 are used by the separate units of system 500, in a manner similar to that described in connection with FIG. 4. A contingent payment calculating unit 522 may be used to calculate contingent payments due to holders based on pre-determined criteria as set forth in the offering documents. For example, a financial debt instrument may utilize the contingent payment calculator 522 to determine the contingent payment amount based on a trigger, such as, for example, trading price of a financial instrument (e.g., the underlying security). A projected payment scheduler 518 projects payments which may be made and schedules them. Incidental analysis unit 519 and probability analysis unit 520 and contingency defining unit 521 may also be provided.

Figure 6:
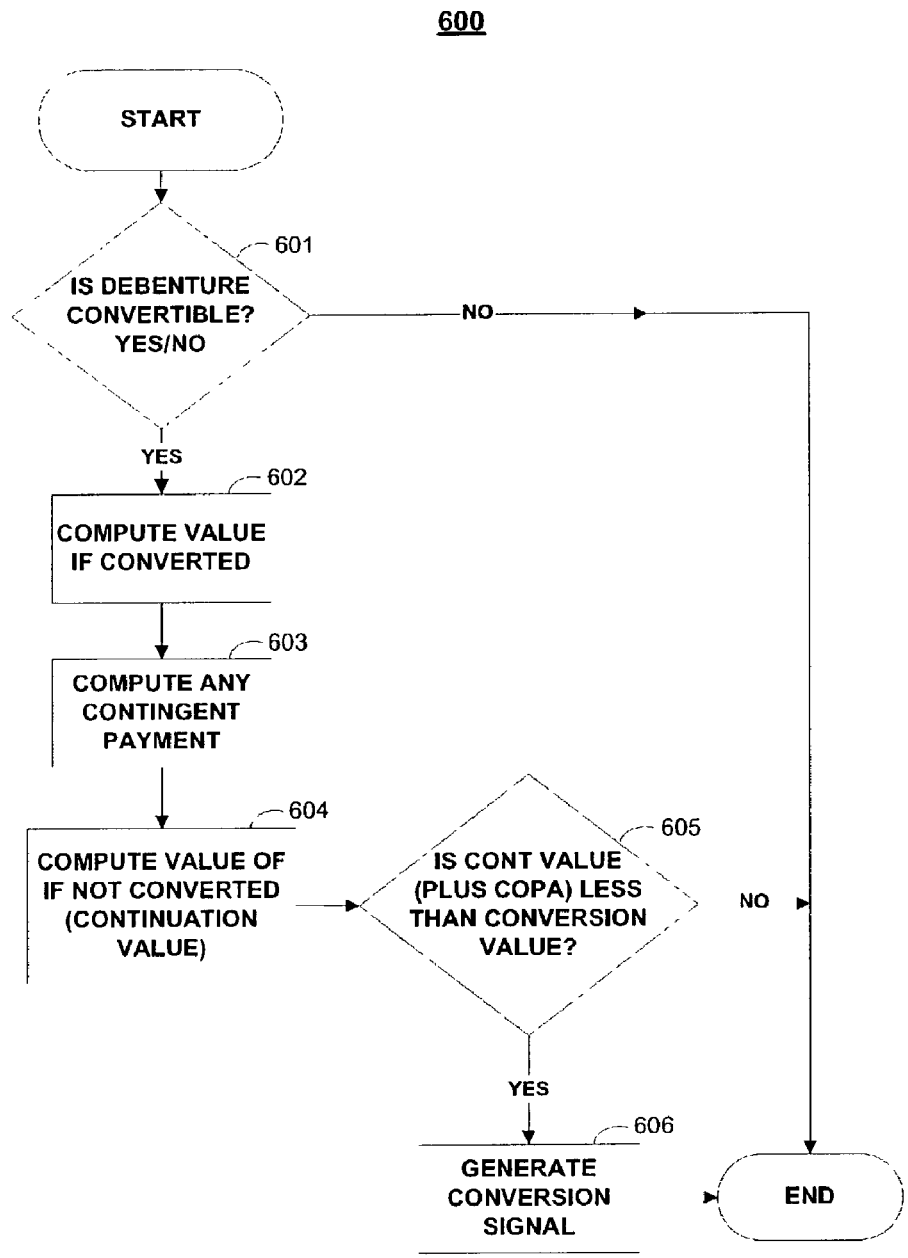
FIG. 6 is a flowchart of illustrative steps involved in providing a company with capital in accordance with some embodiments of the present invention.

FIG. 6 is a flowchart of illustrative steps involved in determining whether to convert a contingent payment debt instrument in accordance with one embodiment of this invention. The method 600, at step 601 determines whether the instrument is convertible. If not, the method ends. If it is, the method, at step 602, computes the value of the instrument if converted. At step 603, the method computes any contingent payments. At step 604, the method computes the value of the debt instrument if not converted. At 605, the method determines whether the continuation value (including contingent payments) is less than the conversion value. If so, a signal to convert is generated at step 606. If not, the method ends.

It will be appreciated by those skilled in the art that while many of the functional blocks shown in FIG. 5 might be implemented as separate physical devices, it is possible and indeed desirable to implement many of them by means of a general-purpose computer executing suitable software.

As previously mentioned, it is possible to represent ownership of financial instruments such as those described here by means of physical certificates. Alternatively, and preferably, ownership is recorded by means of bookkeeping entries by an appropriate entity such as a transfer agent. In either case, there is generally an offering document (a collective term which includes a prospectus, prospectus supplement, offering memorandum, or offering circular). The offering document may be a printed document or may be a data file such as a PDF (portable document format) file. The offering document details the terms of the financial instrument. For example, for a convertible debt instrument, the document will have provisions which detail the principal amount, interest payments, convertibility, contingencies relating to convertibility, and additional payments which might be made upon occurrence of particular contingencies. Further provisions may set forth, for example, the terms upon which the issuer may redeem the instrument. The offering document is often dozens of pages in length or longer.

Stated differently, in accordance with the invention a sequence of steps may be performed.

First, the issuer issues a financial instrument indicative of a principal amount and receives money therefor. The amount of money may be a discounted amount defining the yield of the instrument. The instrument may or may not provide for cash interest payments.

The issuer also promises, pursuant to the financial instrument, to repay the principal upon predetermined conditions and according to a predetermined term. The term may be fixed; the instrument may instead permit the issuer to redeem the instrument before the end of the term under specified circumstances.

The issuer also promises, pursuant to the financial instrument, to allow the investor to convert the instrument into shares of stock of the company at a conversion price. The conversion may be for a specified number of shares associated with the instrument, or may be based upon the conversion price divided into the par value of the instrument. The manner in which the number of shares relates to the par value of the instrument may be constant over the term of the instrument or may vary under specified circumstances.

issuer also promises, pursuant to the financial instrument, to make payments to the holder under predetermined contingencies, as described above.

Finally, the issuer converts the instrument upon request.

The financial instrument is most often an instrument issued by a stock company with respect to a borrowed principal amount, shares of stock of the company trading at a price. The instrument comprises a provision obligating the company to repay the principal according to a predetermined term, a provision making the instrument convertible into a predetermined number of shares of stock of the company.

The financial instrument may or may not comprise a provision obligating the company to make cash interest payments prior to maturity according to a predetermined schedule.

The financial instrument may define a "non-call" period, defined as a period of time during which the issuer cannot contractually redeem the instrument. The instrument may further provide that contingent payments as described herein do not start until after the end of the non-call period.

It will be appreciated that while the benefits of the invention have been chiefly described with respect to a stock company, with conversion of debt into shares of stock of the company, other business entities with different ways of describing equity in the entity may equally enjoy the benefits of the invention. For example a non-US entity may offer "American Depository Receipts" ("ADRs") which represent ownership shares of the entity. Likewise a company could issue a warrant or option giving the holder an opportunity to obtain stock. Convertibility of debt into warrants, options, or ADRs may, with some corporate structures, bring about many of the same benefits as convertibility of debt into stock. Thus, it is possible to describe the invention in a more general way, using the term "indicia of ownership" as a more general term than "shares of stock." It will be appreciated that while the benefits of the invention have been chiefly described with respect to a debt instrument that is convertible into equity (e.g. stock), such benefits may be likewise realized with respect to a variety of other structures. For example, the invention may be applied to an instrument representing preferred stock which is exchangeable for common stock. The invention may be applied to an instrument representing debt which may be converted into stock of a parent or subsidiary of the issuer. It may be applied to an instrument representing debt of a partnership, which debt may be converted into stock of a related or unrelated entity.

Stated most broadly, the financial instrument may be defined with respect to an underlying reference, the underlying reference having a value. Some number of the underlying references is attributed to the financial instrument. The instrument is convertible or exchangeable into the number of underlying references. Furthermore, upon some economically significant contingency, the issuer of the instrument is obligated to make a so-called "contingent payment" to the holder of the instrument.

As previously mentioned, it is possible to represent ownership of financial instruments such as those described here by means of physical certificates. Alternatively, and preferably, ownership is recorded by means of bookkeeping entries by an appropriate entity such as a transfer agent. In either case, there is generally an offering document (a collective term which includes a prospectus, prospectus supplement, offering memorandum, or offering circular). The offering document may be a printed document or may be a data file such as a PDF (portable document format) file. The offering document details the terms of the financial instrument. For example, for a convertible debt instrument, the document will have provisions which detail the principal amount, interest payments, convertibility, and contingencies relating to convertibility. Further provisions may set forth, for example, the terms upon which the issuer may redeem the instrument. The offering document is often dozens of pages in length or longer.

As was mentioned above, for some would-be issuers of a convertible debt instrument there is the concern that the convertible debt instrument would only allow an interest deduction tied to the stated yield or coupon of the instrument. But in at least one country, the tax treatment is that the issuer may enjoy an interest deduction comparable with that of regular corporate debt while typically promising the investor only a relatively low stated up-front return. The investor receives much of its payout instead through conversion and contingency features. The tax treatment is that if such contingencies are not remote nor incidental, they change the instrument enough that the more favorable interest deduction may be received. This is likewise advantageous to the issuer.

Yet another benefit for the issuer is that the contingent payments may motivate the holder to refrain from exercising such conversion rights as the holder may have.

Thus, a convertible debt instrument with contingent payments, and systems and methods for offering and servicing the same are provided. One skilled in the art will appreciate that the present invention can be practiced by other than the described embodiments, which are presented for purposes of illustration and not of limitation. Those skilled in the art will have no difficulty devising obvious variations and enhancements of the invention, all of which are intended to fall within the scope of the claims which follow.

The invention claimed is:

1. A financial instrument system comprising:
   a memory storing financial instrument data associated with a financial instrument issued by a stock company and held by a holder, shares of stock of the company trading at a price, the instrument having a market price; and
   a processor in communication with the memory and operable to:
      calculate a repayment obligation according to a provision of the instrument obligating the company to repay the principal according to a predetermined term;
      calculate a stock conversion according to a provision of the instrument making the instrument convertible into a predetermined number of shares of stock of the company at a predetermined conversion price;

calculate a payment obligation according to a provision of the instrument obligating the company to make a payment to the holder with respect to passage of a time interval in the event the market price of the instrument is in a predetermined relationship to an accreted value thereof, the accreted value as the issue price of the instrument plus an economic accrual of a portion of a difference between the issue price and the principal amount at maturity.

2. The financial instrument system of claim 1 wherein the predetermined relationship is that a predetermined function of the market price of the instrument is greater than 120 percent of the instrument's accreted value.

3. The financial instrument system of claim 2 wherein the predetermined function of the market price is the average market price for a measurement period.

4. The financial instrument system of claim 3 wherein the amount of the payment is selected to be the greater of:
   an amount of any dividend per share of the stock in the interval multiplied by the number of shares of stock into which the instrument may be converted, or
   a predetermined percentage of the average market price of the instrument for the measurement period.

5. The financial instrument system of claim 2 wherein the time interval is six months.

6. The financial instrument system of claim 1 wherein the payment is made over time.

7. The financial instrument system of claim 1 wherein the payment is made by adjusting the principal amount.

8. The financial instrument system of claim 1 wherein the amount of the payment is determined as a function of a value selected from the set consisting of:
   such dividends as holder of the underlying security would normally receive;
   a value of a predetermined index;
   a value of a reference security;
   a value of a pool of securities;
   a value of a pool of indices, and
   a value of a pool of securities and indices.

9. An offering document system comprising:
   a memory storing financial instrument data associated with an offering document offering a financial instrument issued by a stock company and held by a holder, shares of stock of the company trading at a price, the instrument having a market price; and
   a processor in communication with the memory and operable to:
      calculate a repayment obligation according to a provision of the instrument obligating the company to repay the principal according to a predetermined term;
      calculate a stock conversion according to a provision of the instrument making the instrument convertible into a predetermined number of shares of stock of the company at a predetermined conversion price;
      calculate a payment obligation according to a provision of the instrument obligating the company to make a payment to the holder with respect to passage of a time interval in the event the market price of the instrument is in a predetermined relationship to an accreted value thereof, the accreted value defined as the issue price of the instrument plus an economic accrual of a portion of a difference between the issue price and the principal amount at maturity.

10. The offering document system of claim 9 wherein the predetermined relationship is that a predetermined function of the market price of the instrument is greater than 120 percent of the instrument's accreted value.

11. The offering document system of claim 10 wherein the predetermined function of the market price is the average market price for a measurement period.

12. The offering document system of claim 11 wherein the amount of the payment is selected to be the greater of:
   an amount of any dividend per share of the stock in the interval multiplied by the number of shares of stock into which the instrument may be converted, or
   a predetermined percentage of the average market price of the instrument for the measurement period.

13. The offering document system of claim 9 wherein the time interval is six months.

14. The offering document system of claim 9 wherein the payment is made over time.

15. The offering document system of claim 9 wherein the payment is made by adjusting the principal amount.

16. The offering document system of claim 9 wherein the amount of the payment is determined as a function of a value selected from the set consisting of:
   such dividends as holder of the underlying security would normally receive;
   a value of a predetermined index;
   a value of a reference security;
   a value of a pool of securities;
   a value of a pool of indices, and
   a value of a pool of securities and indices;
   period.

17. An offering document system comprising:
   a memory storing offering document data associated with an offering document offering a financial instrument comprising issued by a stock company and held by a holder, shares of stock of the company trading at a price, the instrument having a market price; and
   a processor in communication with the memory and operable to:
      calculate a repayment obligation according to a provision of the instrument obligating the company to repay the principal according to a predetermined term;
      calculate a stock conversion according to a provision of the instrument making the instrument convertible into a predetermined number of shares of stock of the company at a predetermined conversion price;
      calculate a payment obligation according to a provision of the instrument obligating the company to make a payment to the holder upon a contingency; the offering document further comprising an indication that the issuer will report income to the holder based upon a yield at which the issuer would issue a fixed-rate, nonconvertible debt instrument comparable to the financial instrument.

18. The offering document system of claim 17 in which the contingency is with respect to passage of a time interval in the event the market price of the instrument is in a predetermined relationship to an accreted value thereof, the accreted value defined as the issue price of the instrument plus an economic accrual of a portion of a difference between the issue price and the principal amount at maturity.

19. The offering document system of claim 17 wherein the predetermined relationship is that a predetermined function of the market price of the instrument is greater than 120 percent of the instrument's accreted value.

20. The offering document system of claim 18 wherein the time interval is six months.

21. The offering document system of claim 19 wherein the predetermined function of the market price is the average market price for a measurement period.

22. The offering document system of claim 17 wherein the amount of the payment is selected to be the greater of:
 an amount of any dividend per share of the stock in the interval multiplied by the number of shares of stock into which the instrument may be converted, or
 a predetermined percentage of the average market price of the instrument for the measurement period.

23. The offering document system of claim 17 wherein the payment is made over time.

24. The offering document system of claim 17 wherein the payment is made by adjusting the principal amount.

25. The offering document system of claim 17 wherein the amount of the payment is determined as a function of a value selected from the set consisting of:
 such dividends as holder of the underlying security would normally receive;
 a value of a predetermined index;
 a value of a reference security;
 a value of a pool of securities;
 a value of a pool of indices, and
 a value of a pool of securities and indices.

26. An offering document system comprising:
 a memory storing financial instrument data associated with an offering document offering a financial instrument comprising issued by a stock company and held by a holder, shares of stock of the company trading at a price, the instrument having a market price; and
 a processor in communication with the memory and operable to:
  calculate a repayment obligation according to a provision of the instrument obligating the company to repay the principal according to a predetermined term;
  calculate a stock conversion according to a provision of the instrument making the instrument convertible into a predetermined number of shares of stock of the company at a predetermined conversion price;
  calculate a payment obligation according, to a provision of the instrument obligating the company to make a payment to the holder with respect to passage of a time interval in the event the market price of the instrument is in a predetermined relationship to an accreted value thereof, the accreted value defined as the issue price of the instrument plus an economic accrual of a portion of a difference between the issue price and the principal amount at maturity; the offering document further comprising an indication that the issuer will report income to the holder based upon a yield at which the issuer would issue a fixed-rate, nonconvertible debt instrument comparable to the financial instrument.

27. The offering document system of claim 26 wherein the predetermined relationship is that a predetermined function of the market price of the instrument is greater than 120 percent of the instrument's accreted value.

28. The offering document system of claim 27 wherein the predetermined function of the market price is the average market price for a measurement period.

29. The offering document system of claim 28 wherein the amount of the payment is selected to be the greater of:
 an amount of any dividend per share of the stock in the interval multiplied by the number of shares of stock into which the instrument may be converted, or
 a predetermined percentage of the average market price of the instrument for the measurement period.

30. The offering document system of claim 26 wherein the time interval is six months.

31. The offering document system of claim 26 wherein the payment is made over time.

32. The offering document system of claim 26 wherein the payment is made by adjusting the principal amount.

33. The offering document system of claim 26 wherein the amount of the payment is determined as a function of a value selected from the set consisting of
 such dividends as holder of the underlying security would normally receive;
 a value of a predetermined index;
 a value of a reference security;
 a value of a pool of securities;
 a value of a pool of indices, and
 a value of a pool of securities and indices.

34. A financial instrument system comprising:
 a memory storing financial instrument data associated with a financial instrument held by a holder, the instrument having a market price; and
 a processor in communication with the memory and operable to:
  calculate a security conversion or exchange according to a provision of the instrument making the instrument convertible or exchangeable into a predetermined number of an underlying security at a predetermined conversion or exchange price;
  calculate a payment obligation according to a provision of the instrument obligating the company to make a payment to the holder with respect to passage of a time interval in the event the market price of the instrument is in a predetermined relationship to an accreted value thereof, the accreted value defined as the issue price of the instrument plus an economic accrual of a portion of a difference between the issue price and the principal amount at maturity.

35. The financial instrument system of claim 34 wherein the predetermined relationship is that a predetermined function of the market price of the instrument is greater than 120 percent of the instrument's accreted value.

36. The financial instrument system of claim 35 wherein the predetermined function of the market price is the average market price for a measurement period.

37. The financial instrument system of claim 35 wherein the time interval is six months.

38. The financial instrument system of claim 34 wherein the payment is made over time.

39. The financial instrument system of claim 34 wherein the payment is made by adjusting the principal amount.

40. The financial instrument system of claim 34 wherein the amount of the payment is determined as a function of a value selected from the set consisting of
 such dividends as holder of the underlying security would normally receive;
 a value of a predetermined index;
 a value of a reference security;
 a value of a pool of securities;
 a value of a pool of indices, and
 a value of a pool of securities and indices.

41. An offering document system comprising:
- a memory storing financial instrument data associated with an offering document offering a financial instrument held by a holder, the instrument having a market price; and
- a processor in communication with the memory and operable to:
  - calculate a security conversion or exchange according to a provision of the instrument making the instrument convertible or exchangeable into a predetermined number of an underlying security at a predetermined conversion or exchange price;
  - calculate a payment obligation according to a provision of the instrument obligating the company to make a payment to the holder with respect to passage of a time interval in the event the market price of the instrument is in a predetermined relationship to an accreted value thereof, the accreted value defined as the issue price of the instrument plus an economic accrual of a portion of a difference between the issue price and the principal amount at maturity.

42. The offering document system of claim 41 wherein the predetermined relationship is that a predetermined function of the market price of the instrument is greater than 120 percent of the instrument's accreted value.

43. The offering document system of claim 42 wherein the predetermined function of the market price is the average market price for a measurement period.

44. The offering document system of claim 41 wherein the time interval is six months.

45. The offering document system of claim 41 wherein the payment is made over time.

46. The offering document system of claim 41 wherein the payment is made by adjusting the principal amount.

47. The offering document system of claim 41 wherein the amount of the payment is determined as a function of a value selected from the set consisting of:
- such dividends as holder of the underlying security would normally receive; a value of a predetermined index;
- a value of a reference security;
- a value of a pool of securities;
- a value of a pool of indices, and
- a value of a pool of securities and indices.

48. A financial instrument system comprising:
- a memory storing financial instrument data associated with a financial instrument relating to an underlying security, the underlying security trading at a price, the instrument having a market price; and
- a processor in communication with the memory and operable to:
  - calculate a security conversion or exchange according to a provision of the instrument making the instrument convertible or exchangeable into a predetermined number of the underlying security at a predetermined conversion or exchange price;
  - calculate a payment obligation according to a provision of the instrument obligating the company to make a payment to the holder with respect to passage of a time interval in the event the market price of the instrument is in a predetermined relationship to an accreted value thereof, the accreted value defined as the issue price of the instrument plus an economic accrual of a portion of a difference between the issue price and the principal amount at maturity.

49. The financial instrument system of claim 48 wherein the predetermined relationship is that a predetermined function of the market price of the instrument is greater than 120 percent of the instrument's accreted value.

50. The financial instrument system of claim 49 wherein the predetermined function of the market price is the average market price for a measurement period.

51. The financial instrument system of claim 49 wherein the time interval is six months.

52. The financial instrument system of claim 48 wherein the payment is made over time.

53. The financial instrument system of claim 48 wherein the payment is made by adjusting the principal amount.

54. The financial instrument system of claim 48 wherein the amount of the payment is determined as a function of a value selected from the set consisting of:
- such dividends as holder of the underlying security would normally receive;
- a value of a predetermined index;
- a value of a reference security;
- a value of a pool of securities;
- a value of a pool of indices, and
- a value of a pool of securities and indices.

55. An offering document system comprising:
- a memory storing financial instrument data associated with an offering document offering a financial instrument relating to an underlying security, the underlying security trading at a price, the instrument having a market price; and
- a processor in communication with the memory and operable to:
  - calculate a security conversion or exchange according to a provision of the instrument making the instrument convertible or exchangeable into a predetermined number of the underlying security at a predetermined conversion or exchange price;
  - calculate a payment obligation according to a provision of the instrument obligating the company to make a payment to the holder with respect to passage of a time interval in the event the market price of the instrument is in a predetermined relationship to an accreted value thereof, the accreted value defined as the issue price of the instrument plus an economic accrual of a portion of a difference between the issue price and the principal amount at maturity.

56. The offering document system of claim 55 wherein the predetermined relationship is that a predetermined function of the market price of the instrument is greater than 120 percent of the instrument's accreted value.

57. The offering document system of claim 56 wherein the predetermined function of the market price is the average market price for a measurement period.

58. The offering document system of claim 55 wherein the time interval is six months.

59. The offering document system of claim 55 wherein the payment is made over time.

60. The offering document system of claim 55 wherein the payment is made by adjusting the principal amount.

61. The offering document system of claim 55 wherein the amount of the payment is determined as a function of a value selected from the set consisting of:
- such dividends as holder of the underlying security would normally receive;
- a value of a predetermined index;
- a value of a reference security;
- a value of a pool of securities;
- a value of a pool of indices, and
- a value of a pool of securities and indices.

62. An offering document system comprising:

a memory storing financial instrument data associated with an offering document offering a financial instrument relating a stock company, shares of stock of the company trading at a price, the instrument having a market price; and a processor in communication with the memory and operable to:

calculate a repayment obligation according to a provision of the instrument obligating the company to repay the principal according to a predetermined term;

calculate a stock conversion according to a provision of the instrument making the instrument convertible into a predetermined number of shares of stock of the company at a predetermined conversion price;

calculate a payment obligation according to a provision of the instrument obligating the company to make a payment to the holder with respect to a contingency; the offering document further comprising an indication that the issuer will report income to the holder based upon a yield at which the issuer would issue a fixed-rate, non-convertible debt instrument comparable to the financial instrument.

63. An offering document system comprising:

a memory storing financial instrument data associated with an offering document offering a financial instrument, the instrument having a market price; and a processor in communication with the memory and operable to:

calculate a stock exchange according to a provision of the instrument making the instrument exchangeable into a predetermined number of shares of stock of a company;

calculate a payment obligation according to a provision of the instrument obligating the company to make a payment to the holder with respect to a contingency; the offering document further comprising an indication that the issuer will report income to the holder based upon a yield at which the issuer would issue a fixed-rate, nonconvertible debt instrument comparable to the financial instrument.

\* \* \* \* \*